US012627378B2

(12) United States Patent
Bahadur et al.

(10) Patent No.: US 12,627,378 B2
(45) Date of Patent: May 12, 2026

(54) METHOD AND A SYSTEM FOR TUNING TUNABLE OPTICAL TRANSCEIVERS

(71) Applicant: Centre for Development of Telematics (C-DOT), New Delhi (IN)

(72) Inventors: Jainendra Bahadur, New Delhi (IN); Ashish Kumar Pandey, New Delhi (IN); Deepika Ambwani, New Delhi (IN)

(73) Assignee: Centre for Development of Telematics (C-DOT), New Delhi (IN)

( * ) Notice: Subject to any disclaimer, the term of this patent is extended or adjusted under 35 U.S.C. 154(b) by 280 days.

(21) Appl. No.: 18/343,357

(22) Filed: Jun. 28, 2023

(65) Prior Publication Data

US 2024/0007191 A1     Jan. 4, 2024

(30) Foreign Application Priority Data

Jun. 29, 2022    (IN) .............................. 202211037418

(51) Int. Cl.
| | |
|---|---|
| *H04B 10/572* | (2013.01) |
| *H04B 10/079* | (2013.01) |
| *H04B 10/40* | (2013.01) |
| *H04J 14/02* | (2006.01) |

(52) U.S. Cl.
CPC ....... *H04B 10/40* (2013.01); *H04B 10/07957* (2013.01); *H04B 10/572* (2013.01); *H04J 14/0242* (2013.01)

(58) Field of Classification Search
CPC ...................... H04B 10/07957; H04B 10/572; H04B 10/40; H04J 14/0242

USPC .............. 398/95, 135, 137, 162, 196, 69–72
See application file for complete search history.

(56) References Cited

U.S. PATENT DOCUMENTS

| | | | |
|---|---|---|---|
| 2007/0280695 A1 | 12/2007 | Li et al. | |
| 2015/0318930 A1* | 11/2015 | Grobe | H04J 14/0307 |
| | | | 398/79 |
| 2017/0170898 A1* | 6/2017 | Fu | H04B 10/0799 |
| 2017/0279533 A1 | 9/2017 | Elahmadi et al. | |
| 2017/0353268 A1* | 12/2017 | Jung | H04L 1/0045 |
| 2018/0337728 A1* | 11/2018 | Kim | H04B 10/079 |
| 2020/0220624 A1* | 7/2020 | Shu | H04J 14/0257 |
| 2023/0327769 A1* | 10/2023 | Oe | H04B 10/40 |
| | | | 398/135 |
| 2025/0141555 A1* | 5/2025 | Oe | H04B 10/40 |

FOREIGN PATENT DOCUMENTS

| | | | |
|---|---|---|---|
| CN | 106911419 A | * | 6/2017 |
| CN | 115065437 A | * | 9/2022 |
| KR | 101572043 | | 11/2015 |

* cited by examiner

*Primary Examiner* — Li Liu
(74) *Attorney, Agent, or Firm* — LEYDIG, VOIT & MAYER, LTD.

(57)     ABSTRACT

A method for tuning one or more tunable optical transceivers is disclosed herein. A controller assigns a particular wavelength to a tunable optical transceiver of the one or more tunable optical transceivers, where the one or more tunable optical transceivers and the controller are connected via an Inter-Integrated Circuit (I2C) interface. The tunable optical transceiver transmits an optical signal using the particular wavelength, where the particular wavelength is finalized for the tunable optical transceiver when an interrupt at a receiving port of the tunable optical transceiver is received.

5 Claims, 6 Drawing Sheets

HUB SITE

METHOD AND A SYSTEM FOR TUNING TUNABLE OPTICAL TRANSCEIVERS

CROSS-REFERENCE TO RELATED APPLICATIONS

This application claims priority from Indian Patent Application No. 202211037418, filed Jun. 29, 2022, which is incorporated by reference herein to the extent that there is no inconsistency with the present disclosure.

TECHNICAL FIELD

The present disclosure generally relates to tuning of tunable optical transceivers. More particularly, the disclosure relates to tuning of a hub site and a node site optical transceivers with the help of controllers residing on the hub site and the node site.

BACKGROUND

This section is intended to introduce the reader to various aspects of art that may be related to various aspects of the present disclosure, which are described below. This disclosure is believed to be helpful in providing the reader with background information to facilitate a better understanding of the various aspects of the present disclosure. Accordingly, it should be understood that these statements are to be read in this light, and not just as admissions of prior art.

A wavelength division multiplexing-passive optical network (WDM-PON) is based on a dense wavelength-division multiplexing (DWDM) technology which is regarded as an ideal solution to meet the 5G front haul requirements. The WDM-PON is highly recommended for low-latency 5G front haul. The point to point WDM-PON is to be standardised under G.9804.x. With increase in the bandwidth demand, the network densification increases which has led to increase in the number of optical transceivers (OT) in current networks for supporting more numbers of antennas. The cheaper optical transceivers are those which support fixed wavelengths but the stock management process becomes complex and cumbersome for the fixed wavelength transceivers that results in the increase in network complexity. Inter-integrated circuit (I2C) tunable optical transceivers are a boon as it provides wider tuning range and greatly simplifies the inventory management process but requires a separate channel for management and wavelength configuration. This may require separate fibre and use of one or more technologies/protocols.

To overcome the above issues, the optical industry has come out with a solution of auto-tunable optical transceivers. These are plug and play solutions with no inventory management. The disadvantage here is that the transceiver vendors offer proprietary transceivers at exorbitantly high prices and lack cross vendor interoperability. The transceivers on both sides of the system have to be from the same vendor for auto tuning feature to operate. Hence, all the above schemes significantly increase the capital expenditures (CAPEX) and operating expenses (OPEX) for the network.

In the light of aforementioned challenges, there is a need for a method/protocol/scheme which can limit the CAPEX and the OPEX for the network.

SUMMARY

A method for tuning one or more tunable optical transceivers is disclosed herein. A controller assigns a particular wavelength to a tunable optical transceiver of the one or more tunable optical transceivers, where the one or more tunable optical transceivers and the controller are connected via an Inter-Integrated Circuit (I2C) interface. The tunable optical transceiver transmits an optical signal using the particular wavelength, where the particular wavelength is finalized for the tunable optical transceiver when an interrupt at a receiving port of the tunable optical transceiver is received.

Optionally, each tunable optical transceiver is an Inter-Integrated Circuit (I2C) tunable optical transceiver, and optionally, each tunable optical transceiver is a master tunable optical transceiver controlled via the controller.

Optionally, assigning the particular wavelength to the tunable optical transceiver comprises assigning the particular wavelength to a transmitting port of the tunable optical transceiver.

Optionally, assigning the particular wavelength to the tunable optical transceiver comprises assigning the particular wavelength to a transmitting port of the tunable optical transceiver, and optionally, assigning the particular wavelength to the tunable optical transceiver is based on dynamic mapping stored in an internal memory of the controller.

Optionally, when the interrupt at the receiving port of the tunable optical transceiver is not received for a first threshold period, disabling the optical signal transmission using the particular wavelength for a second threshold period.

Optionally, assigning the particular wavelength to the tunable optical transceiver comprises assigning the particular wavelength to a transmitting port of the tunable optical transceiver.

Optionally, assigning the particular wavelength to the tunable optical transceiver comprises assigning the particular wavelength to a transmitting port of the tunable optical transceiver, and optionally, assigning the particular wavelength to the tunable optical transceiver is based on dynamic mapping stored in an internal memory of the controller.

Optionally, when the interrupt at the receiving port of the tunable optical transceiver is not received for a first threshold period, disabling the optical signal transmission using the particular wavelength for a second threshold period.

Optionally, after disabling the optical signal transmission using the particular wavelength for the second threshold period, transmitting again the optical signal using the particular wavelength.

Optionally, the particular wavelength is finalized for the tunable optical transceiver when an interrupt at the receiving port of the tunable optical transceiver is received.

According to another aspect of the present disclosure, there is provided a method for tuning one or more tunable optical transceiver. A controller receives an interrupt upon receiving an optical signal at a tunable optical transceiver of the one or more tunable optical transceiver, where the one or more tunable optical transceivers and the controller are connected via an Inter-Integrated Circuit (I2C) interface. The controller assigns a first wavelength to a transmitting port of the tunable optical transceiver based on a first occurrence of the interrupt.

Optionally, each tunable optical transceiver is an Inter-Integrated Circuit (I2C) tunable optical transceiver, and optionally, where each tunable optical transceiver is a slave tunable optical transceiver.

Optionally, receiving the optical signal at the tunable optical transceiver comprises receiving the optical signal at a receiving port of the tunable optical transceiver.

Optionally, assigning the first wavelength to the transmitting port of the tunable optical transceiver based on the first occurrence of the interrupt is based on dynamic mapping stored in an internal memory of the controller.

Further, a master tunable optical transceiver transmits a first feedback optical signal using the first wavelength via the transmitting port of the tunable optical transceiver, and optionally, the method further comprising assigning a second wavelength to the transmitting port of the tunable optical transceiver when an interrupt occurs or upon receiving the optical signal at the tunable optical transceiver again after a threshold period.

A master tunable optical transceiver transmits a second feedback optical signal using the second wavelength via the transmitting port of the tunable optical transceiver.

Optionally, assigning of the second wavelength is based on the dynamic mapping.

According to another aspect of the present disclosure, a system comprising one or more master tunable optical transceivers and one or more slave tunable optical transceivers is disclosed. A master controller assigns a first wavelength to a first master tunable optical transceiver of the one or more master tunable optical transceivers, where the one or more master tunable optical transceivers and the master controller are connected via an Inter-Integrated Circuit (I2C) interface. The first master tunable optical transceiver transmits a first optical signal using the first wavelength to a first slave tunable optical transceiver of the one or more slave tunable optical transceiver. A first slave controller receives a first interrupt upon receiving the first optical signal at the first slave tunable optical transceiver, where the one or more slave tunable optical transceivers and the first slave controller are connected via an I2C interface. The first slave controller assigns a first wavelength to a transmitting port of the first slave tunable optical transceiver when the first interrupt is occurred for a first time, where the first wavelength is finalized for the master controller and the first slave tunable optical transceivers when a first feedback interrupt is registered at the master controller.

Optionally, the system transmits, to the first master tunable optical transceiver, the first feedback optical signal using the first wavelength via the transmitting port of the first slave tunable optical transceiver.

Optionally, the master controller assigns a second wavelength to a second master tunable optical transceiver of the one or more master tunable optical transceivers. The second master tunable optical transceiver transmits a second optical signal using the second wavelength to a second slave tunable optical transceiver of the one or more slave tunable optical transceiver. A slave controller receives a first interrupt upon receiving the second optical signal at the second slave tunable optical transceiver. The second controller assigns the first wavelength to a transmitting port of the second slave tunable optical transceiver when the first interrupt is occurred for the first time.

Further, the second slave tunable optical transceiver transmits a feedback signal using the first wavelength, where no signal or interrupt is received by the second master tunable optical transceiver. When no interrupt at the second master tunable optical transceiver is received for a first threshold period, the second master tunable optical transceiver disables the transmission using the second wavelength for a second threshold period. After disabling the transmission using the second wavelength for the second threshold period, the second master tunable optical transceiver transmits again the second optical signal using the second wavelength to the second slave optical transceiver.

Optionally, the second slave controller assigns the second wavelength to the second slave tunable optical transceiver when a second interrupt occurs on the reception of the second optical signal, where the second wavelength is finalized for the second master and the second slave tunable optical transceivers when a second feedback interrupt is registered at the master controller.

Optionally, the system further transmits, to the second master tunable optical transceiver, the second feedback optical signal using the second wavelength via the transmitting port of the second slave tunable optical transceiver.

Optionally, the first feedback interrupt is registered at the master controller based on the reception of the first feedback optical signal at the receiving port of the first master tunable optical transceiver.

Optionally, the second feedback interrupt is registered at the master controller based on reception of the second feedback optical signal at the receiving port of the second master tunable optical transceiver.

Optionally, the system repeats the above mentioned steps till desired number of optical transceiver of the one or more optical transceiver are tuned.

The disclosure provides a scheme where optical transceivers can be self-tuned to a particular wavelength using the I2C tunable optical transceivers only. There will be no need for the costly auto tunable optical transceiver. There is minimal requirement of hardware and software to provide this feature in any system. This scheme will help to save on CAPEX, OPEX and also provide cross vendor compatibility. The I2C tunable OTs are tuned via a controller residing on the system via a I2C interface. The I2C controlled OTs at both the ends are tuned via a software scheme which is interoperable with all the I2C tunable OTs.

Accordingly, an aspect of the present disclosure is to provide cross vendor interoperability w.r.t. optical transceivers, low cost solution w.r.t. auto tunable optical transceivers, no requirement of inventory management, providing auto tunable feature for WDM-PON systems which are proposed to be used in the existing/upcoming 4G/5G network deployments, supporting wideband wavelength tuning (present market has only proprietary narrowband solutions available), BBU and RRU subsystems of different vendors can be upgraded to this feature with minimal software and hardware interventions, and OLT and ONT subsystems of different vendors can be upgraded to this feature with minimal software and hardware interventions.

BRIEF DESCRIPTION OF THE DRAWINGS

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings in which.

DETAILED DESCRIPTION

Figure 1:
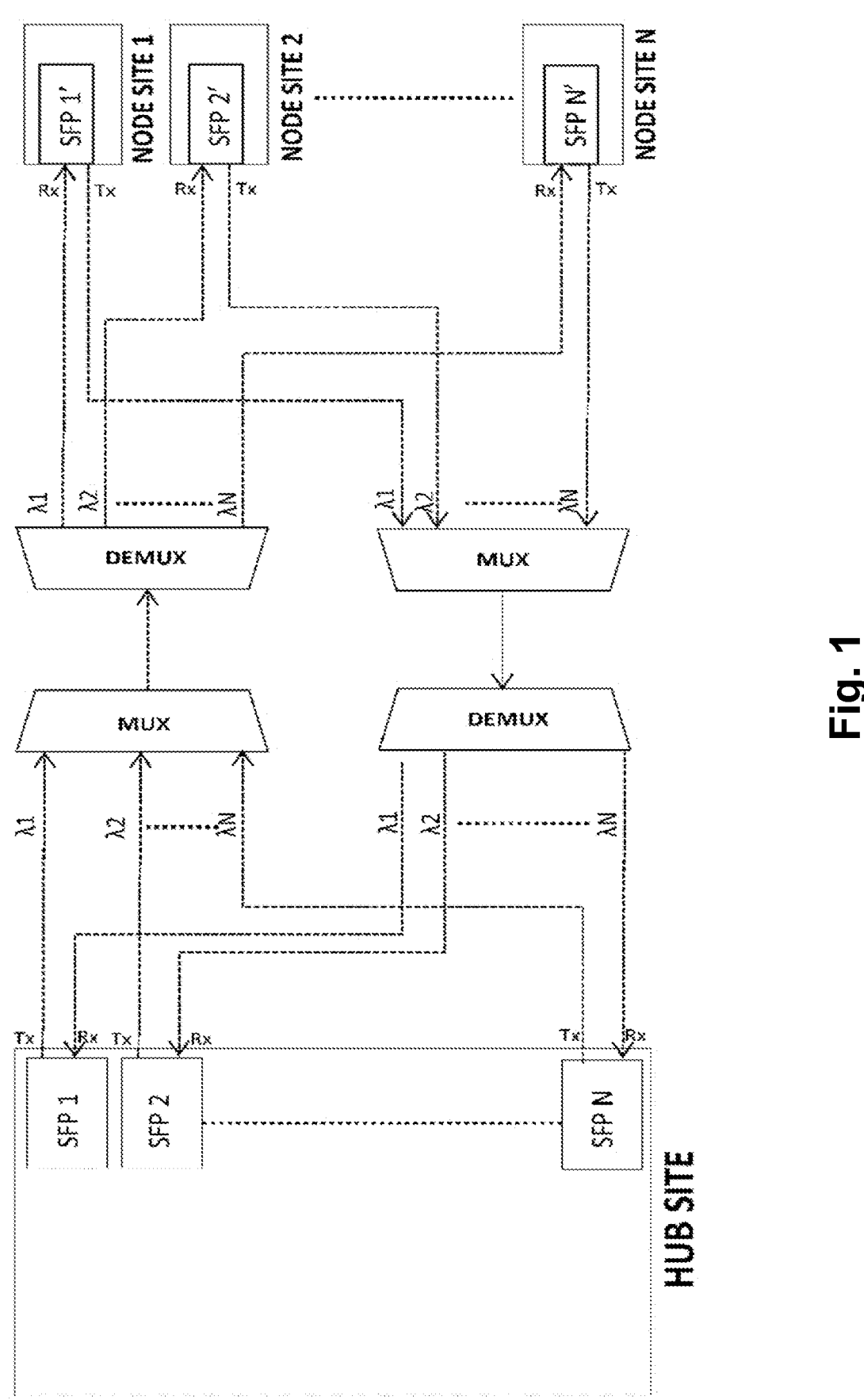
FIG. 1 illustrates block diagram representation of wavelength division multiplexing-passive optical network (WDM-PON) in accordance with an embodiment of the disclosure.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof. Throughout the patent specification, a convention employed is that in the appended drawings, like numerals denote like components.

Reference throughout this specification to "an embodiment", "another embodiment", "an implementation", "another implementation" or similar language means that a particular feature, structure, or characteristic described in connection with the embodiment is included in at least one embodiment of the present disclosure. Thus, appearances of the phrase "in an embodiment", "in another embodiment", "in one implementation", "in another implementation", and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures.

Unless otherwise defined, all technical and scientific terms used herein have the same meaning as commonly understood by one of ordinary skill in the art to which this disclosure belongs. The apparatus, system, and examples provided herein are illustrative only and not intended to be limiting.

The terms "a" and "an" herein do not denote a limitation of quantity, but rather denote the presence of at least one of the referenced item. Further, the term sterile barrier and sterile adapter denotes the same meaning and may be used interchangeably throughout the description.

Embodiments of the disclosure will be described below in detail with reference to the accompanying drawings.

An aspect of the present disclosure is to provide cross vendor interoperability w.r.t. optical transceivers, low cost solution w.r.t. auto tunable optical transceivers, no requirement of inventory management, providing auto tunable feature for wavelength division multiplexing-passive optical network (WDM-PON) systems which are proposed to be used in the existing/upcoming 4G/5G network deployments, supporting wideband wavelength tuning (present market has only proprietary narrowband solutions available), BBU, and RRU subsystems of different vendors can be upgraded to this feature with minimal software and hardware interventions, and OLT and ONT subsystems of different vendors can be upgraded to this feature with minimal software and hardware interventions.

FIG. 1 describes a wavelength division multiplexing-passive optical network (WDM-PON) network. The hub site element can be a switch or OLT. The optical transceivers can be SFP/SFP+/SFP28 or any other type of hot pluggable optical modules as per the network requirement. The passive Mux/Demux will be placed near the hub site. The hub site and the node site distance can be 10 kms-20 kms or more as per the network requirement. Similarly, the node site will also have the Mux/Demux to connect the node site element such as switch or ONT/ONU as per the network requirement.

Figure 2:
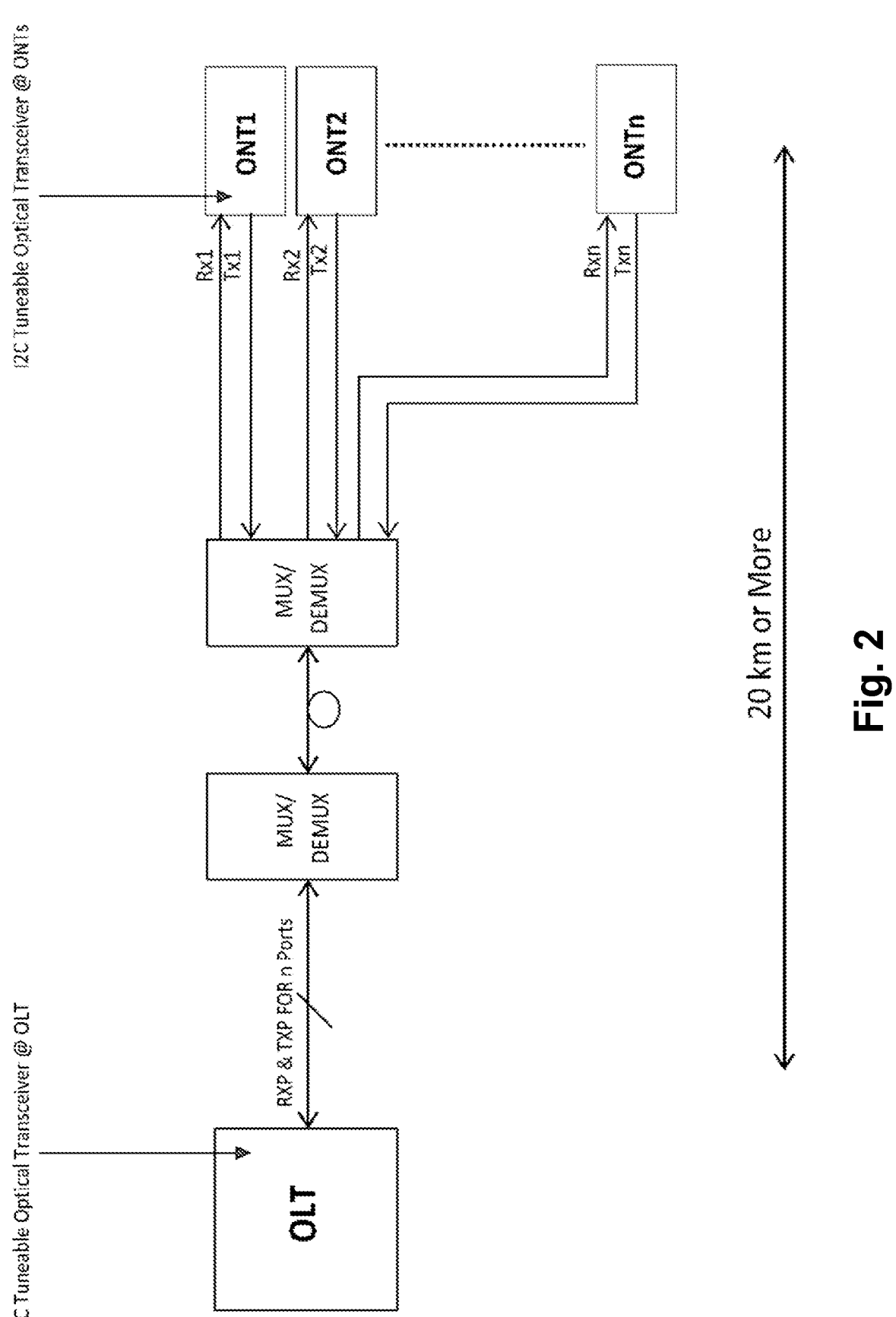
FIG. 2 illustrates block diagram representation of auto tuning of optical transceivers in accordance with an embodiment of the disclosure.

Optical transceivers are of two types: one having fixed wavelength (defined by ITUT grid) and other having tunable wavelength transceivers. The tunable transceivers are tuned to particular wavelength via inter-integrated circuit (I2C) with the help of microcontroller. In the current market for the WDM-PON type network application auto-tunable optical transceivers are also available. The ascending order of their cost is given below:

Fixed optical transceiver<tunable optical transceiver<<auto-tunable optical transceiver As shown in FIGS. 1-2, in the WDM-PON network, the fixed type optical transceivers can be used for network deployment. But the stock management process becomes complex and cumbersome in case of the fixed wavelength transceivers that results in the increase in network complexity and installation as the process become manual.

Figure 3:
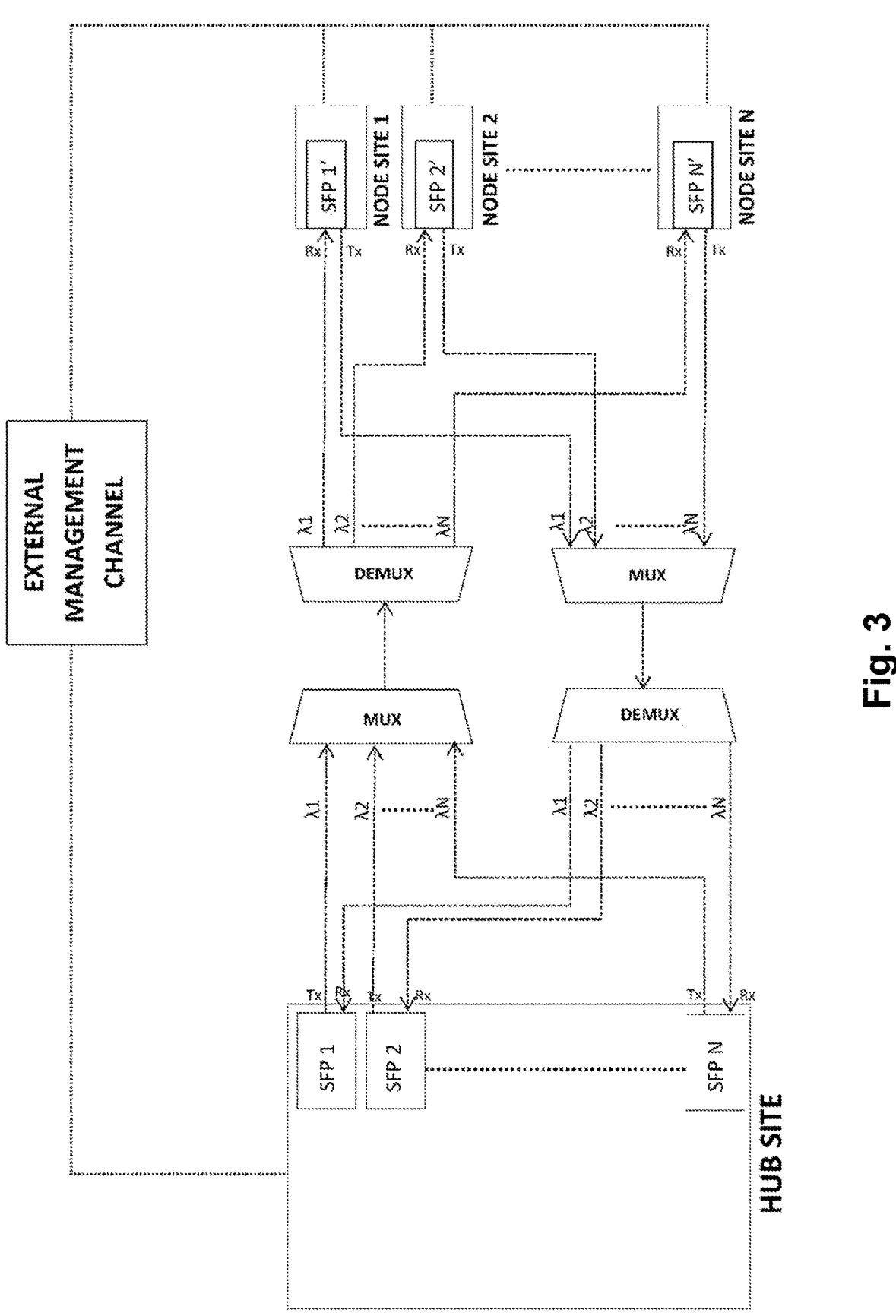
FIG. 3 illustrates block diagram representation of the WDM-PON network with tunable transceiver managed by external management channel in accordance with an embodiment of the disclosure.

The I2C tunable optical transceivers are better places as it provides wider tuning range (as per ITU-T Grid) and greatly simplifies the inventory management process. But it requires a separate channel for management and wavelength configuration. Additionally, as shown in FIG. 3, this may require a separate fibre and use of one or more technologies/protocols to communicate with them.

Figure 4:
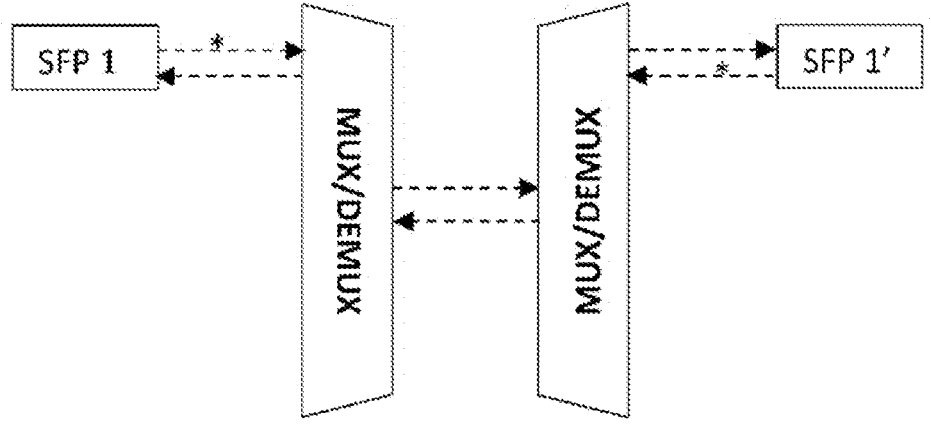
FIG. 4 illustrates block diagram representation an auto tunable transceiver in accordance with an embodiment of the disclosure.

To overcome the above issues, the optical industry has come out with a solution of auto-tunable optical transceivers. The auto tunable optical transceivers module does prior exercise before establishing a communication link. These transceivers auto-discover and self-tune to individual DWDM (dense wavelength-division multiplexing) wavelengths (as per ITU-T grid) without manipulation by any external channel, as shown in FIG. 4. These are plug and play solutions with no inventory management.

The disadvantage here is that the optical vendors offer proprietary transceivers at exorbitantly high prices and these solution lacks the cross-vendor interoperability. The transceivers on both sites of the system have to be from the same vendor for auto tuning feature to operate. Hence, all the above schemes significantly increase the capital expenditures (CAPEX) and operating expenses (OPEX) for the network deployment.

The discloser mentions a scheme where the optical transceivers can be self-tuned to a particular wavelength using the I2C tunable optical transceivers only. There will be no need for the costly auto tunable optical transceiver. There is minimal requirement of hardware and software to provide this feature in any system. This scheme will help to save on the CAPEX, the OPEX and also provide cross vendor compatibility.

Figure 5:
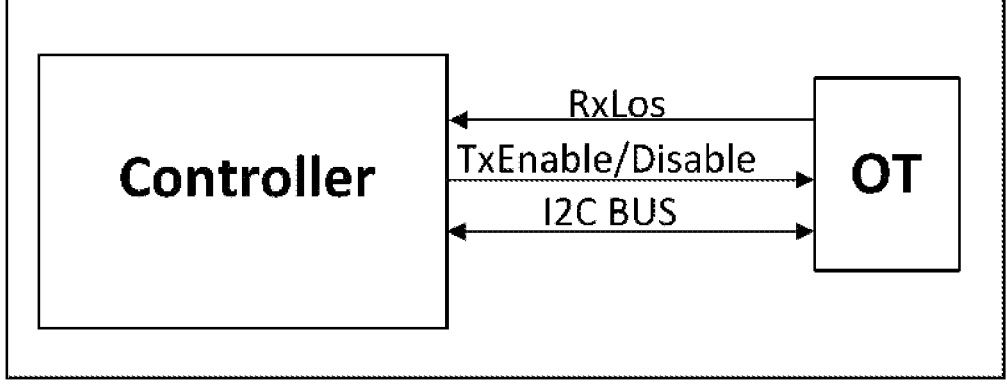
FIG. 5 illustrates block diagram representation of a hardware connection in accordance with an embodiment of the disclosure.

The disclosure embodies a scheme where optical transceivers can be self-tuned to a particular wavelength using the I2C tunable optical transceivers only. There will be no need for the costly auto tunable optical transceiver. There is minimal requirement of hardware and software to provide this feature in any system. This scheme will help to save on the CAPEX, the OPEX and also provide cross vendor compatibility. The I2C tunable OTs are tuned via a controller residing on the system via a I2C interface as shown in the FIG. 5. The I2C controlled OTs at both the ends are tuned via a software scheme which is interoperable with all the I2C tunable OTs.

The optical Transceiver are tuned via the controller residing on the system with the help of the I2C interface. The I2C controlled optical transceiver at both the ends are tuned via a software scheme which is interoperable with all the I2C tunable optical transceiver. The optical transceivers have broadband receiver and tunable transmitter in the C-band as per the ITU-T standard.

Figure 6:
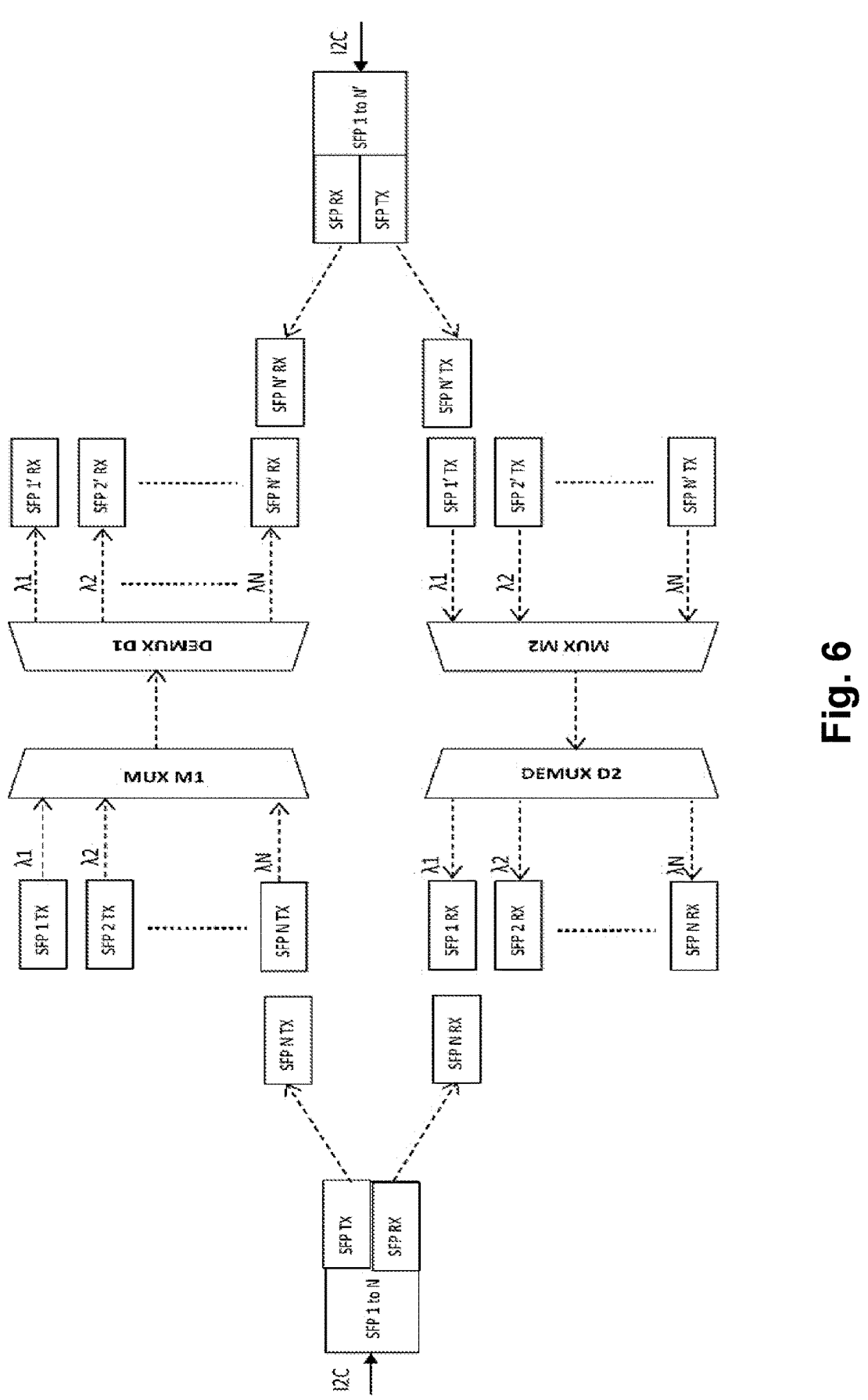
FIG. 6 illustrates block diagram representation of various optical elements on the hub and node sites in accordance with an embodiment of the disclosure.
Figure 7:
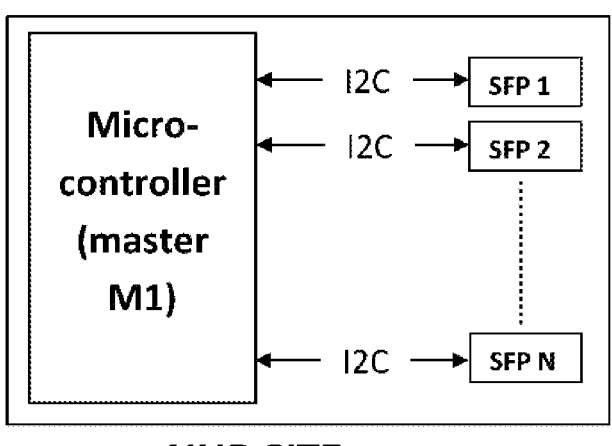
FIG. 7 illustrates block diagram representation of hub site elements with the optical transceivers (SFPi, i=1, 2, . . . N) in accordance with an embodiment of the disclosure.
Figure 8:
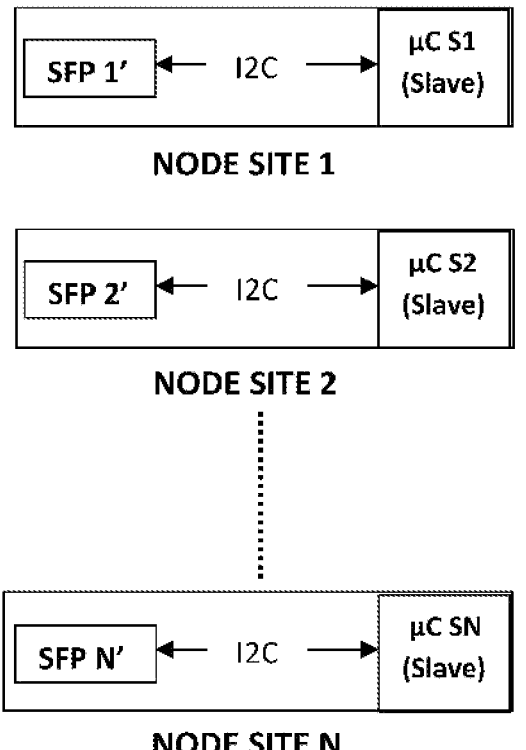
FIG. 8 illustrates block diagram representation of node site elements with the optical transceivers (SFPi'; i=1, 2, . . . N) in accordance with an embodiment of the disclosure.

As shown in FIG. 6, the microcontroller on the master site will have the control to tune optical transceivers and it has dynamic mapping in the internal memory via which it will assign the particular wavelength to the particular transceiver. Below are the steps which will be executed for the assigning the wavelengths. The node site slave controller will also have dynamic mapping stored in its memory. Additionally, FIGS. 7 and 8 shows the microcontroller on the Master site (hub site) and the slave microcontrollers on the node site, respectively. Further, the node site slave controller will make a decision based on the algorithm described in the steps:

STEP 1: A master controller (M1) will assign a $\lambda1$ wavelength to the Tx port of a first master tunable optical transceiver (SFP1).

STEP 2: Upon receiving an optical signal on a first slave tunable optical transceiver (SFP1') Rx port. An interrupt will be registered on the slave microcontroller (S1 or µC S1).

STEP 3: The slave microcontroller (S1 or µC S1) will have dynamic mapping of wavelength assignment. Further, the slave microcontroller (S1 or µC S1) will tune the Tx port of the first slave tunable optical transceiver (SFP1') to the $\lambda1$ wavelength only as per the first occurrence.

STEP 4: The first master tunable optical transceiver (SFP1) will receive the interrupt on its Rx port and the $\lambda1$ wavelength will be final as per the dynamic mapping.

STEP 5: Further, the master controller (M1) tunes a second master tunable optical transceiver (SFP2) and assigns the $\lambda2$ wavelength to Tx port of the second master tunable optical transceiver (SFP2).

STEP 6: The second slave tunable optical transceiver (SFP2') will receive the interrupt on the Rx port and with the help of dynamic mapping it will tune the Tx port of the second slave tunable optical transceiver (SFP2') to $\lambda1$ wavelength as per the first occurrence.

STEP 7: But the second master tunable optical transceiver (SFP2) will not get any interrupt and the predefine waiting period will be over. The master controller (M1)

will time out for that port and it will again start exercise for the second master tunable optical transceiver (SFP2), where the second master tunable optical transceiver (SFP2) will not get any interrupt because multiplexer (MUX M2) will not pass the $\lambda1$ wavelength because the Mux port can only pass the $\lambda2$ wavelength.

STEP 8: The master controller (M1) will disable the Tx port of the second master tunable optical transceiver (SFP2) and will enable again due to this second interrupt will be registered at the second slave tunable optical transceiver (SFP2').

STEP 9: The slave microcontroller (S2) will have second occurrence of interrupt and with the help of dynamic mapping it will tune the Tx port of the second slave tunable optical transceiver (SFP2') to $\lambda2$ wavelength.

STEP 10: A interrupt will be registered at the Rx port of the second master tunable optical transceiver (SFP2). The master controller (M1) will assign the $\lambda2$ wavelength to the Tx port of the second master tunable optical transceiver (SFP2) and will further move on for the next transceiver a third master tunable optical transceiver (SFP3). The process will continue till the desired number of optical transceivers are tuned.

A further embodiment of the disclosure discloses a method for tuning one or more tunable optical transceivers. The controller assigns a particular wavelength to a tunable optical transceiver of the one or more tunable optical transceivers, where the one or more tunable optical transceivers and the controller are connected via an Inter-Integrated Circuit (I2C) interface. The tunable optical transceiver transmits an optical signal using the particular wavelength, where the particular wavelength is finalized for the tunable optical transceiver when an interrupt at a receiving port of the tunable optical transceiver is received.

In an another embodiment, each tunable optical transceiver is an Inter-Integrated Circuit (I2C) tunable optical transceiver. Further, each tunable optical transceiver is a master tunable optical transceiver controlled via the controller.

In an another embodiment, assigning the particular wavelength to the tunable optical transceiver comprises assigning the particular wavelength to a transmitting port of the tunable optical transceiver.

In an another embodiment, assigning the particular wavelength to the tunable optical transceiver is based on dynamic mapping stored in an internal memory of the controller.

In an another embodiment, when the interrupt at the receiving port of the tunable optical transceiver is not received for a first threshold period, disabling the optical signal transmission using the particular wavelength for a second threshold period.

In an another embodiment, after disabling the optical signal transmission using the particular wavelength for the second threshold period, transmitting again the optical signal using the particular wavelength.

In an another embodiment, the particular wavelength is finalized for the tunable optical transceiver when an interrupt at the receiving port of the tunable optical transceiver is received.

A further embodiment of the disclosure discloses a method for tuning one or more tunable optical transceiver. The controller receives an interrupt upon receiving an optical signal at a tunable optical transceiver of the one or more tunable optical transceiver, where the one or more tunable optical transceivers and the controller are connected via an Inter-Integrated Circuit (I2C) interface. The controller assigns a first wavelength to a transmitting port of the tunable optical transceiver based on a first occurrence of the interrupt.

In an another embodiment, each tunable optical transceiver is an Inter-Integrated Circuit (I2C) tunable optical transceiver. Each tunable optical transceiver is a slave tunable optical transceiver.

In an another embodiment, receiving the optical signal at the tunable optical transceiver comprises receiving the optical signal at a receiving port of the tunable optical transceiver.

In an another embodiment, assigning the first wavelength to the transmitting port of the tunable optical transceiver based on the first occurrence of the interrupt is based on dynamic mapping stored in an internal memory of the controller.

In an another embodiment, a master tunable optical transceiver transmits a first feedback optical signal using the first wavelength via the transmitting port of the tunable optical transceiver.

In an another embodiment, the method further comprising assigning a second wavelength to the transmitting port of the tunable optical transceiver when an interrupt occurs for a second time or upon receiving the optical signal at the tunable optical transceiver again.

In an another embodiment, a master tunable optical transceiver receives a second feedback optical signal using the second wavelength via the transmitting port of the tunable optical transceiver.

In an another embodiment, assigning of the second wavelength is based on the dynamic mapping.

A further embodiment of the disclosure discloses a system comprising one or more master tunable optical transceivers and one or more slave tunable optical transceivers. A master controller assigns a first wavelength to a first master tunable optical transceiver of the one or more master tunable optical transceivers, where the one or more master tunable optical transceivers and the master controller are connected via an Inter-Integrated Circuit (I2C) interface. The first master tunable optical transceiver transmits a first optical signal using the first wavelength to a first slave tunable optical transceiver of the one or more slave tunable optical transceiver. A first slave controller receives a first interrupt upon receiving the first optical signal at the first slave tunable optical transceiver, where the one or more slave tunable optical transceivers and the first slave controller are connected via an I2C interface.

Further, the first slave controller assigns a first wavelength to a transmitting port of the first slave tunable optical transceiver when the first interrupt is occurred for a first time, where the first wavelength is finalized for the master controller and the first slave tunable optical transceivers when a first feedback interrupt is registered at the master controller.

In an another embodiment, the first master tunable optical transceiver transmits the first feedback optical signal using the first wavelength via the transmitting port of the first slave tunable optical transceiver.

In an another embodiment, the master controller assigns a second wavelength to a second master tunable optical transceiver of the one or more master tunable optical transceivers. The second master tunable optical transceiver transmits a second optical signal using the second wavelength to a second slave tunable optical transceiver of the one or more slave tunable optical transceiver.

Further, the slave controller receives a first interrupt upon receiving the second optical signal at the second slave tunable optical transceiver. The second controller assigns the first wavelength to a transmitting port of the second slave tunable optical transceiver when the first interrupt is occurred for the first time.

Furthermore, the second slave tunable optical transceiver transmits a feedback signal using the first wavelength, where no signal or interrupt is received by the second master tunable optical transceiver. when no interrupt at the second master tunable optical transceiver is received for a first threshold period, the second master tunable optical transceiver disables the transmission using the second wavelength for a second threshold period. After disabling the transmission using the second wavelength for the second threshold period, the second master tunable optical transceiver transmits again the second optical signal using the second wavelength to the second slave optical transceiver.

Furthermore, the second slave controller assigns the second wavelength to the second slave tunable optical transceiver when a second interrupt occurs on the reception of the second optical signal, where the second wavelength is finalized for the second master and the second slave tunable optical transceivers when a second feedback interrupt is registered at the master controller.

Furthermore, the second master tunable optical transceiver receives the second feedback optical signal using the second wavelength via the transmitting port of the second slave tunable optical transceiver. Where the first feedback interrupt is registered at the master controller based on the reception of the first feedback optical signal at the receiving port of the first master tunable optical transceiver.

Furthermore, where the second feedback interrupt is registered at the master controller based on reception of the second feedback optical signal at the receiving port of the second master tunable optical transceiver. The system further comprising repeating the above mentioned steps w.r.t. the system till desired number of optical transceiver of the one or more optical transceiver are tuned.

The foregoing descriptions of exemplary embodiments of the present disclosure have been presented for purposes of illustration and description. They are not intended to be exhaustive or to limit the disclosure to the precise forms disclosed, and obviously many modifications and variations are possible in light of the above teaching. The exemplary embodiment was chosen and described in order to best explain the principles of the disclosure and its practical application, to thereby enable others skilled in the art to best utilize the disclosure and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present disclosure.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the disclosure, any limitations arising on account of the same are not intended. As would be apparent to a person in the art, various working modifications may be made to the apparatus in order to implement the inventive concept as taught herein.

We claim:

1. A system comprising one or more master tunable optical transceivers and one or more slave tunable optical transceivers, the system is configured to:

assign, by a master controller, a first wavelength to a first master tunable optical transceiver of the one or more master tunable optical transceivers, wherein the one or more master tunable optical transceivers and the master controller are connected via an Inter-Integrated Circuit (I2C) interface;

transmit, by the first master tunable optical transceiver, a first optical signal using the first wavelength to a first slave tunable optical transceiver of the one or more slave tunable optical transceiver;

receive, by a first slave controller, a first interrupt upon receiving the first optical signal at the first slave tunable optical transceiver, wherein the one or more slave tunable optical transceivers and the first slave controller are connected via an I2C interface;

assign, by the first slave controller, a first wavelength to a transmitting port of the first slave tunable optical transceiver when the first interrupt is occurred for a first time, wherein the first wavelength is finalized for the master controller and the first slave tunable optical transceivers when a feedback optical signal is received by the first master tunable optical transceiver and a first feedback interrupt is registered at the master controller;

assign, by the master controller, a second wavelength to a second master tunable optical transceiver of the one or more master tunable optical transceivers;

transmit, by the second master tunable optical transceiver, a second optical signal using the second wavelength to a second slave tunable optical transceiver of the one or more slave tunable optical transceiver;

receive, by a second slave controller, a first interrupt upon receiving the second optical signal at the second slave tunable optical transceiver;

assign, by the second slave controller, the first wavelength to a transmitting port of the second slave tunable optical transceiver when the first interrupt is occurred for the first time;

transmit, by the second slave tunable optical transceiver, a second feedback optical signal using the first wavelength, wherein no signal or interrupt is received by the second master tunable optical transceiver;

when no interrupt at the second master tunable optical transceiver is received for a first threshold period, disable, by the second master tunable optical transceiver, the transmission using the second wavelength for a second threshold period;

after disabling the transmission using the second wavelength for the second threshold period, transmit, by the second master tunable optical transceiver, again the second optical signal using the second wavelength to the second slave optical transceiver; and assign, by the second slave controller, the second wavelength to the second slave tunable optical transceiver when a second interrupt occurs on the reception of the second optical signal after the second threshold period, wherein the second wavelength is finalized for the second master and the second slave tunable optical transceivers when a second feedback interrupt is registered at the master controller.

2. The system as claimed in claim 1, further comprising transmitting, to the first master tunable optical transceiver, the feedback optical signal using the first wavelength via the transmitting port of the first slave tunable optical transceiver.

3. The system as claimed in claim 1, further comprising transmitting, to the second master tunable optical transceiver, the feedback optical signal using the second wavelength via the transmitting port of the second slave tunable optical transceiver.

4. The system as claimed in claim 1, wherein the feedback interrupt is registered at the master controller based on the reception of the feedback optical signal at the receiving port of the first master tunable optical transceiver.

5. The system as claimed in claim 1, wherein the feedback interrupt is registered at the master controller for the first time based on reception of the feedback optical signal at the receiving port of the second master tunable optical transceiver.

* * * * *